(12) United States Patent
Dong et al.

(10) Patent No.: US 8,390,770 B2
(45) Date of Patent: Mar. 5, 2013

(54) LIQUID CRYSTAL DISPLAY, COLOR FILTER SUBSTRATE AND MANUFACTURING METHOD THEREOF

(75) Inventors: Min Dong, Beijing (CN); Haiyu Zhao, Beijing (CN); Seongyeol Yoo, Beijing (CN); Zhaohui Hao, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 418 days.

(21) Appl. No.: 12/718,483

(22) Filed: Mar. 5, 2010

(65) Prior Publication Data

US 2010/0225858 A1   Sep. 9, 2010

(30) Foreign Application Priority Data

Mar. 6, 2009   (CN) .......................... 2009 1 0079291

(51) Int. Cl.
 *G02F 1/1333*   (2006.01)
(52) U.S. Cl. ........................ 349/110; 349/106
(58) Field of Classification Search .................. None
 See application file for complete search history.

(56) References Cited

U.S. PATENT DOCUMENTS

| 5,680,187 A * | 10/1997 | Nagayama et al. ........... 349/110 |
| 6,099,993 A * | 8/2000 | Kim et al. ...................... 430/7 |
| 7,259,806 B1 * | 8/2007 | Lee et al. ........................ 349/43 |
| 2001/0026347 A1 * | 10/2001 | Sawasaki et al. ............. 349/156 |
| 2003/0160914 A1 | 8/2003 | Ha |
| 2007/0109469 A1 | 5/2007 | Jeon et al. |
| 2007/0159588 A1 * | 7/2007 | Yoon ............................. 349/156 |
| 2009/0161047 A1 * | 6/2009 | Cho et al. ..................... 349/106 |

FOREIGN PATENT DOCUMENTS

| CN | 1538194 A | 10/2004 |
| CN | 1963618 A | 5/2007 |
| JP | 2005-099393 A | 4/2005 |
| JP | 2005099393 A * | 4/2005 |

\* cited by examiner

*Primary Examiner* — Thanh-Nhan P Nguyen
(74) *Attorney, Agent, or Firm* — Ladas & Parry LLP

(57) ABSTRACT

An embodiment of the invention provides a color filter substrate comprising first black matrixes; color resin units; and a protection layer. Each of the color resin units is formed between two adjacent first black matrixes, the protection layer is formed on the first black matrixes and the color resin units, second black matrixes are formed, each corresponding to one first black matrix, on the protection layer for blocking reflected light from the first black matrixes from entering TFT channel regions on an array substrate to be provided to oppose the color filter substrate.

21 Claims, 3 Drawing Sheets

LIQUID CRYSTAL DISPLAY, COLOR FILTER SUBSTRATE AND MANUFACTURING METHOD THEREOF

BACKGROUND

The invention relates to a liquid crystal filter, a color filter substrate and a manufacturing method thereof.

A Liquid crystal display (LCD) device comprises an array substrate and a color filter substrate assembled together with a liquid crystal layer interposed therebetween. The array substrate comprises gate lines, data lines, pixel electrodes and thin film transistors (TFTs) that are formed thereon. The gate lines and data lines cross each other and define pixel regions, in which the TFTs and the pixel electrodes are formed. The gate lines provide gate signals (e.g., ON signal) for the TFTs, and the data lines provide data signals for pixel electrodes in the pixel regions. Images in gray scales are displayed by controlling the twisting or deflecting of the liquid crystal in the liquid crystal material. The color filter substrate comprises black matrixes, color resin units, a protection layer and a common electrode layer that are formed thereon. The color resin units may comprise red, blue and green resin units. Black matrixes are disposed on the color filter substrate for separating color resin units and preventing light from leaking.

The black matrixes on the color filter substrate are generally formed on positions corresponding to the gate lines, the data lines and the TFTs formed on the array substrate. In this way, light incident from the color filter substrate side can be blocked by the black matrixes so that light from outside can not be incident on the channel regions of the TFTs, ensuring the electrical characteristics of the TFTs. However, it is found that light from the array substrate side (such as light from the backlight provided under the array substrate) may result in degradation of the electrical characteristics of the TFTs. Researches show that when light from the backlight is incident on the black matrixes at an inclined angle, even if the black matrixes may absorb most of the light, a part of the light is reflected by the black matrixes and incident into channel regions of TFTs, which causes the TFTs to generate a relatively large leakage current. Increase of the leakage current of the TFTs makes voltage sustaining rate decrease, which causes an abnormal black display in normal white mode such that contrast ratio is degraded.

SUMMARY

An embodiment of the invention provides a color filter substrate comprising first black matrixes; color resin units; and a protection layer. Each of the color resin units is formed between two adjacent first black matrixes, the protection layer is formed on the first black matrixes and the color resin units, second black matrixes are formed, each corresponding to one first black matrix, on the protection layer for blocking reflected light from the first black matrixes from entering TFT channel regions on an array substrate to be provided to oppose the color filter substrate.

Another embodiment of the present invention provides a liquid crystal display comprising: an array substrate, on which a plurality of thin film transistors (TFTs) are provided; a color filter substrate provided opposite to the array substrate; and a liquid crystal layer interposed between the array substrate and the color filter substrate. The color filter substrate comprises first black matrixes, color resin units and a protection layer. Each of the color resin units is formed between two adjacent first black matrixes, the protection layer is formed on the first black matrixes and the color resin units, second black matrixes are formed, each corresponding to one first black matrix, on the protection layer for blocking reflected light from the first black matrixes from entering TFT channel regions on the array substrate.

Further another embodiment of the present invention provides a method for manufacturing a color filter substrate, comprising: step 1 of forming first black matrixes and color resin units on a substrate; and step 2 of forming a protection layer and second black matrixes on the substrate obtained after step 1, wherein each of the second black matrixes is formed on the protection layer in an area corresponding to one first black matrix.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The invention will become more fully understood from the detailed description given hereinafter and the accompanying drawings which are given by way of illustration only, and thus are not limitative of the invention and wherein.

DETAILED DESCRIPTION OF THE PREFERRED EMBODIMENTS

Embodiments of the invention will be described more fully hereinafter with reference to the accompanying drawings.

Figure 1:
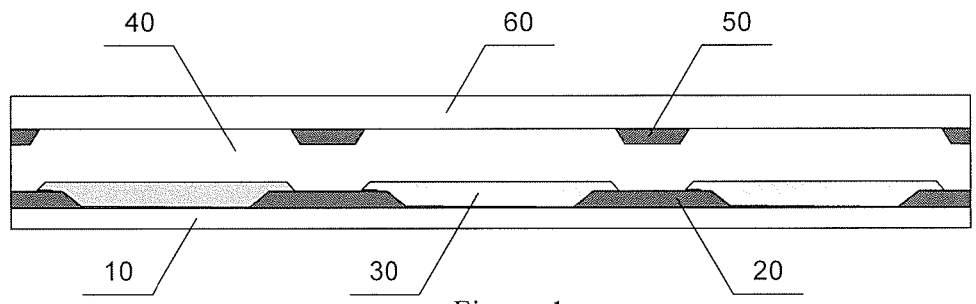
FIG. 1 is a structural view of a color filter substrate according to a first exemplary embodiment of the invention.

FIG. 1 is a structural view of a color filter substrate according to a first exemplary embodiment of the invention. As shown in FIG. 1, the color filter substrate 100 comprises a substrate 10, first black matrixes 20, color resin units 30, a protection layer 40, second black matrixes 50 and a common electrode layer 60. The first black matrixes 20 and the color resin units 30 are formed on the substrate 10, and one color resin unit 30 is formed between two adjacent first black matrixes 20. The color resin units 30 comprise red, blue and green resin units, which are formed sequentially between the black matrixes 20. The protection layer 40 is formed on the first black matrixes 20 and color resin units 30 and covers the entire surface of the substrate 10. The second black matrixes 50 are disposed in the grooves (or trenches) formed on the surface of the protection layer 40 and located in areas corresponding to the first black matrix 20. The second black matrixes 50 are used to block and absorb light reflected by the first black matrixes 20. According to the present embodiment, one second black matrix 50 is disposed in an area corresponding to each first black matrix 20. The second black matrixes 50 correspond to the TFT channel regions on the array substrate opposing the color filter substrate in a LCD device, and each of the second black matrixes 50 has a width less than that of the corresponding first black matrix 20. The common electrode layer 60 is formed on the protection layer 40 and the second black matrixes 50 and covers the entire surface of the substrate 10.

In the present embodiment, grooves are formed on the surface of the protection layer 40 to accommodate the second black matrixes 50 therein. The second black matrixes 50 are disposed in the grooves such that the surface of the protection layer 40 and the surfaces of the second black matrixes 50 can collectively form a flat surface. The common electrode layer 60 is formed on the flattened surface.

In another embodiment, the common electrode 60 is formed on the first black matrixes 20 and the color resin units 30, the protection layer 40 is formed on the common electrode 60, and in turn the second black matrixes 50 are formed on the protection layer 40.

The present embodiment will be further described hereinafter by explaining the manufacturing process of the color filter substrate according to the first embodiment of the invention.

Figure 2:
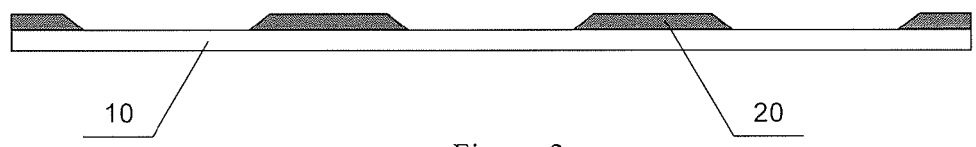
FIG. 2 is a view of a color filter substrate at the stage of having formed a first black matrix in the manufacturing process, according to a first exemplary embodiment of the invention.

FIG. 2 is a view of a color filter substrate at the stage after first black matrixes are formed in the manufacturing process according to a first exemplary embodiment of the invention. A black matrix material layer is first deposited on a substrate 10 such as a glass substrate or a silica substrate. A metal or resin material that has good capability of blocking light can be used for the black matrix material layer. Next, as shown in FIG. 2, the first black matrixes 20 are formed in an array arrangement. If a resin material is used for forming the black matrix material layer, the process of forming the first black matrixes may comprise: first forming a layer of the resin material, for example, by using plasma enhanced chemical vapor deposition (PECVD) method; next, exposing the layer of resin material to energy ray (e.g., light) by using a normal mask to form a first area (totally-exposed area) and a second area (totally-unexposed area) of the resin layer; after developing, the layer of resin material in the second area is completely removed, and the layer of the resin material in the first area is totally remained; after baking process, the first black matrixes 20 is formed. If a metal material is used to form the black matrix material layer, the process of forming the first black matrix may comprise: first forming a layer of metal material by using a magnetron sputtering or evaporating method; next, coating a layer of photoresist on the metal material layer; exposing the photoresist layer to energy ray by using a normal mask for forming a first area (totally-exposed area) and a second area (totally-unexposed area) of the photoresist layer; after developing, the layer of photoresist in the second area is completely removed, and the layer of the photoresist in the first area is totally remained; the metal layer in the second area is etched away by etching process; after removing the remained photoresist, the first black matrixes 20 are formed. In the above and the following processes, a negative type of photoresist is used as an example.

Figure 3:
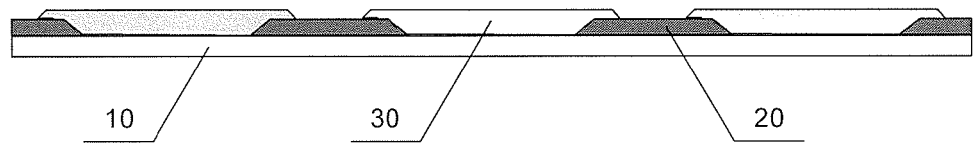
FIG. 3 is a view of a color filter substrate at the stage of having formed a color resin unit in the manufacturing process, according to a first exemplary embodiment of the invention.

FIG. 3 is a view of a color filter substrate at the stage after color resin units have been formed on the substrate 10 according to a first exemplary embodiment of the invention. First, a layer of a red resin material is coated on the substrate 10. Next, the red resin layer is exposed to energy ray by using a normal mask for forming a first area (totally-exposed area) and a second area (totally-unexposed area) of the resin layer. After developing, the resin layer in the second area is completely removed, and the resin layer in the first area is totally remained. After baking process, the red resin units are formed. Blue resin units and green resin units are formed in the same way. The red, blue and green resin units constitute a color resin unit and are correspondingly located between adjacent first black matrixes 20, as shown in FIG. 3. The resin units of the three colors can be formed in any sequence as necessary.

Figure 4:
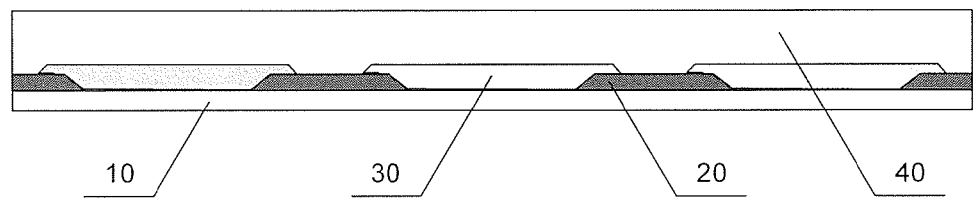
FIG. 4 is a view of a color filter substrate at the stage of having formed a protection layer in the manufacturing process, according to a first exemplary embodiment of the invention.

FIG. 4 is a view of a color filter substrate at the stage after a protection layer has been formed in the manufacturing process according to a first exemplary embodiment of the invention. Referring to FIG. 4, a protection layer 40 having a thickness of 1.5 µm~2.5 µm is for example coated on the substrate 10 formed as shown in FIG. 3 to get a flat surface.

Figure 5:
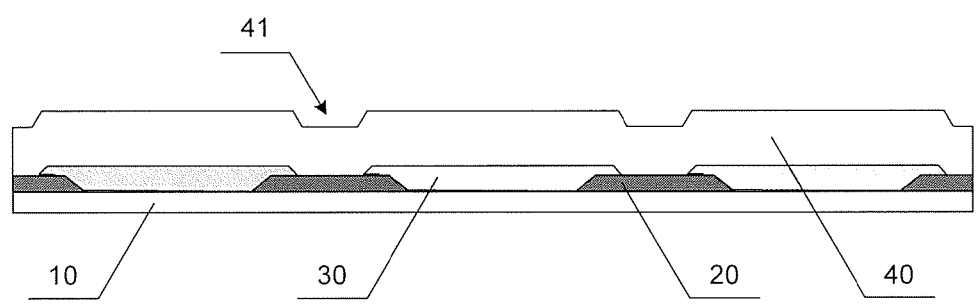
FIG. 5 is a view of a color filter substrate at the stage of having formed a groove pattern on the protection layer in the manufacturing process, according to a first exemplary embodiment of the invention.

FIG. 5 is a view of a color filter substrate at the stage after grooves have been formed on the protection layer in the manufacturing process according to a first exemplary embodiment of the invention. Referring to FIG. 5, the protection layer 40 is exposed to energy ray using a normal mask for forming a first area (totally-exposed area) and a second area (partially-unexposed area). After developing, the protection layer 40 in the second area is partially removed, and the protection layer 40 in the first area remains intact. The depth of the groove 41 can be controlled by adjusting the transmissive rate or exposure amount of the mask for the second area.

The above described process for forming the grooves has been employed if the protection layer is formed of an organic material. If the protection layer is formed of inorganic material such as silicon nitride, the grooves can be formed as following. First a layer of photoresist is coated on the protection layer 40, and the photoresist layer is exposed to energy ray by using a normal mask for forming a first area (totally-exposed area) and a second area (totally-unexposed area). After developing, the layer of photoresist in the second area is completely removed, and the layer of the photoresist in the first area is totally remained. The protection layer in the second area is partially etched by etching process. After removing the remained photoresist, groove patterns are formed on the protection layer.

Figure 6:
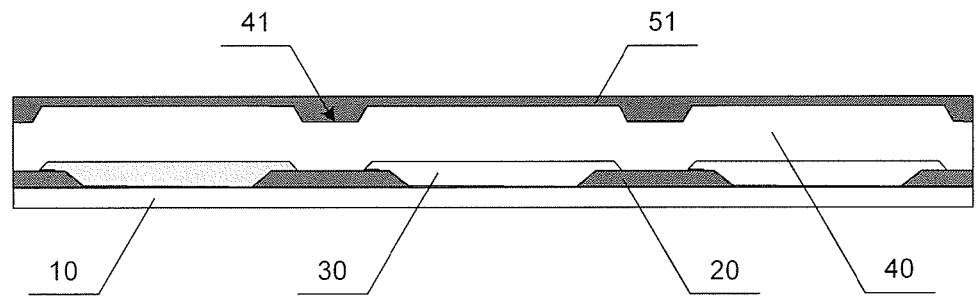
FIG. 6 is a view of a color filter substrate at the stage of having deposited a black matrix material layer in the manufacturing process, according to a first exemplary embodiment of the invention.

FIG. 6 is a view of a color filter substrate at the stage after a black matrix material layer has been formed in the manufacturing process, according to a first exemplary embodiment of the invention. Referring to FIG. 6, a black matrix material layer 51 is formed on the substrate 10 as shown in FIG. 5. The thickness of the black matrix material layer 51 is larger than the depth of the grooves 41 such that the black matrix material layer 51 can be fully filled in the grooves 41. A metal or resin material that has good capability of blocking light can be used for the black matrix material layer. In the manufacturing process, if a resin material is used for the black matrix material, the resin material may be deposited by using plasma enhanced chemical vapor deposition (PECVD) method. Alternately, if a metal material is used for the black matrix material, a layer of the metal material may be deposited by using a magnetron sputtering or evaporating method.

Figure 7:
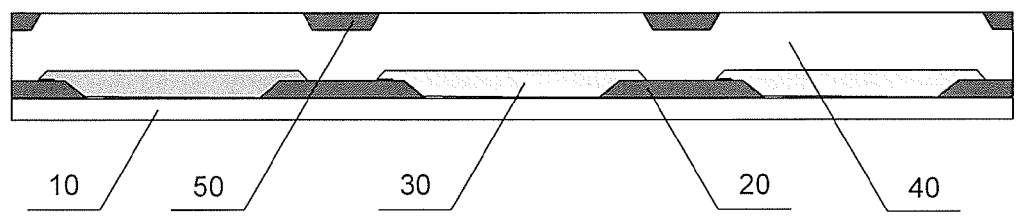
FIG. 7 is a view of a color filter substrate at the stage of having formed a second black matrix pattern in the manufacturing process, according to a first exemplary embodiment of the invention.

FIG. 7 is a view of a color filter substrate at the stage after second black matrixes have been formed in the manufacturing process, according to a first exemplary embodiment of the invention. Referring to FIG. 7, the excessive black matrix material on the protection layer 40 is removed by using a flatting process, such that second black matrixes 50 are formed only in the grooves 41 and the protection layer 40 and the second black matrixes 50 collectively provide a flat surface. In the manufacturing process, if a resin material is used for the black matrix material, the excessive black matrix material on the surface level of the protection layer 40 may be removed by using an ashing process. Alternately, if a metal material is used for the black matrix material, the excessive black matrix material on the surface level of the protection layer 40 may be removed by using a chemical mechanical polishing (CMP) method.

Finally, a transparent conductive film of 1000 Å~1500 Å of a material, such as indium tin oxide (ITO), indium zinc oxide (IZO), aluminum zinc oxide (AZO), is deposited to form a common electrode layer 60 on the substrate 10 by using a magnetron sputtering or evaporating method, as shown in FIG. 7. Other transparent metal or metal oxide materials may be used to form the common electrode layer. In this way, the manufacturing of a color filter substrate according to the present embodiment is completed as shown in FIG. 1.

Figure 8:
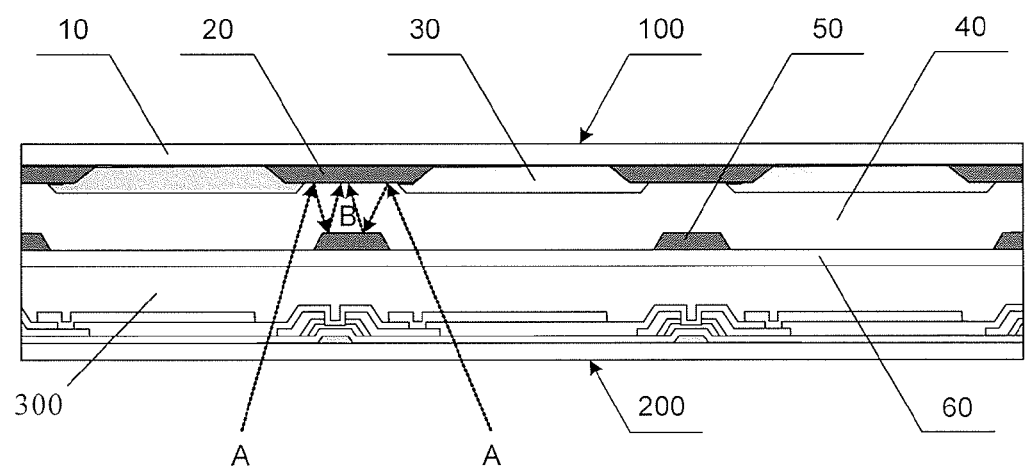
FIG. 8 is a view of a liquid crystal display assembled with a color filter substrate of the present invention.

FIG. 8 is a view of a liquid crystal display (LCD) assembled with the color filter substrate according to the embodiment of the present invention. The LCD comprises the color filter substrate 100 and an array substrate 200 assembled together, and a liquid crystal layer 300 is interposed between the color filter substrate 100 and the array substrate 200. The color filter substrate 100 embodies the structure of the color filter substrate according to the embodiment of the invention. The array substrate 200 may be a conventional array substrate, on which pixel electrodes and the thin film transistor for controlling the pixel electrodes are formed in an array. In operation, incident light A from a backlight enters into the LCD from the array substrate 200 and reaches the surface of the first black matrixes 20 on the color filter substrate 100. Even if the first black matrixes 20 may absorb most of the light, a part of the light is reflected by the black matrixes 20 and becomes reflected light B. As a result of the second black matrixes 50 disposed on the color filter substrate 100, the reflected light B can be blocked by the second black matrixes 50. The second black matrixes 50 absorb most of the reflected light B, and only a small portion of the reflected light B is reflected again back to the surface of the first black matrixes 20. In this way, the first black matrixes 20 and the second black matrixes 50 may repeatedly absorb and reflect light. The protection layer 60 may have a thickness of about 1.6 which is similar to the distance between the array substrate 200 and the color filter substrate 100 of about 3.7 μm. Thus, the second black matrixes 50 may block the reflected light from the first black matrixes 20, such that the light amount incident onto the TFT channel regions on the array substrate 200 is greatly decreased and the leakage current can be effectively avoided. In practice, the position and size of the second black matrixes may be determined according to parameters such as the size of the TFTs and the distance between the array substrate 200 and the color filter substrate 100. In this embodiment, the common electrode 60 on the color filter substrate functions together with the pixel electrodes on the array substrate to control the liquid crystal layer to display images.

The present embodiment provides a color filter substrate, in which a first black matrix and a second black matrix are disposed. The first black matrix may function as a conventional black matrix. The second black matrix can effectively block the light that comes from the array substrate side and is reflected by the surface of the first black matrix, so that the reflected light from the surface of the first black matrix is not incident onto the TFT channel region on the array substrate. Compared with a color filter substrate having only one layer of black matrix, the embodiment of the invention can effectively avoid the generation of leakage current by reducing the amount of the reflected light from the first black matrix that is incident onto the TFT channel region of the array substrate. As a result, the voltage sustaining rate and contrast ratio can be promoted, and quality of the LCD is improved accordingly. The color filter substrate of the embodiment can be applied to the LCDs of, for example, FFS mode, IPS mode, TN mode, VA mode and the like. The color filter substrate of the embodiment may also be applied to a reflective or transflective LCD. In another embodiment, the color filter substrate used for an FFS mode or IPS mode LCD may not comprise the common electrode, and the common electrode that functions with the pixel electrodes on an array substrate is also formed on the array substrate. The description for such array substrate for an FFS mode or IPS mode LCD is omitted here for simplicity.

Figure 9:
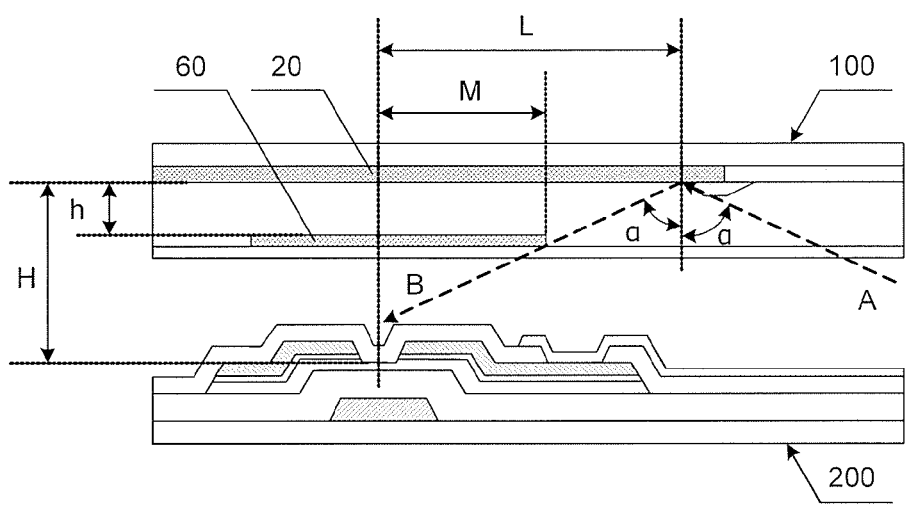
FIG. 9 is a view showing the working principle of a color filter substrate according to a first exemplary embodiment of the invention.

FIG. 9 is a view showing the working principle of the color filter substrate according to the first exemplary embodiment of the invention. After the color filter substrate 100 and the array substrate 200 are assembled together, a distance between the center of a TFT channel region on the array substrate 200 and a side edge of the corresponding first black matrix pattern 20 on the color filter substrate 100 is L; a distance between the center of the TFT channel region on the array substrate 200 and a corresponding outer edge of the second black matrix pattern 50 on the color filter substrate 100 is M; a distance between the bottom surface of the TFT channel region on the array substrate 200 and a surface of the first black matrix pattern 20 on the color filter substrate 100 is H; and a distance between the opposed surfaces of the first black matrix 20 and the second black matrix 50 on the color filter substrate 100 is h. According to the light reflection principle, for the light A from a backlight and the light B reflected from the surface of the first black matrix 20, the size of the second black matrix 50 should satisfy that reflected light from the side edge of the first black matrix 20 is totally blocked by the second black matrix 50 and will not be incident onto the TFT channel region on the array substrate. Assuming that an incident angle of the incident light A at a side edge of the first black matrix is $\alpha$ and a reflective angle of the reflected light B is also $\alpha$, the following equations are obtained.

$$tg\alpha = \frac{L-M}{h} \quad (1)$$

$$tg\alpha = \frac{L}{H} \quad (2)$$

Equation (3) is obtained from equations (1) and (2).

$$M = L\left(1 - \frac{h}{H}\right) \quad (3)$$

The least distance M at which the outer edge of the second black matrix 50 can totally prevent the reflected light from the first black matrix 20 from entering the TFT channel region on the array substrate can be obtained form equation (3). That is, a distance between the center of the TFT channel region and a corresponding outer edge of the second black matrix pattern should be larger than a value of M obtained by equation (3). In other words, the largest distance between an outer edge of the second black matrix and a side edge of the first black matrix on a same side of a TFT channel region is:

$$L - M = L\frac{h}{H}.$$

Similarly, parameters for another outer edge of the second black matrix on another side of the TFT channel region can be obtained.

Similarly, according to the light reflection principle, for the light A from a backlight, the reflected light B from an outer side edge of the second black matrix 50 should not enter into the TFT channel region. The largest size of the second black matrix 50 should satisfy that reflected light B is prevented from entering the TFT channel region. However, a distance between the bottom surface of the TFT channel region and a surface of the second black matrix 50 is much smaller than a width of a pixel electrode on the array substrate 200, and as a result, incident light reflected from the surface of the second black matrix 50 and entering the TFT channel region actually does not exist.

Figure 10:
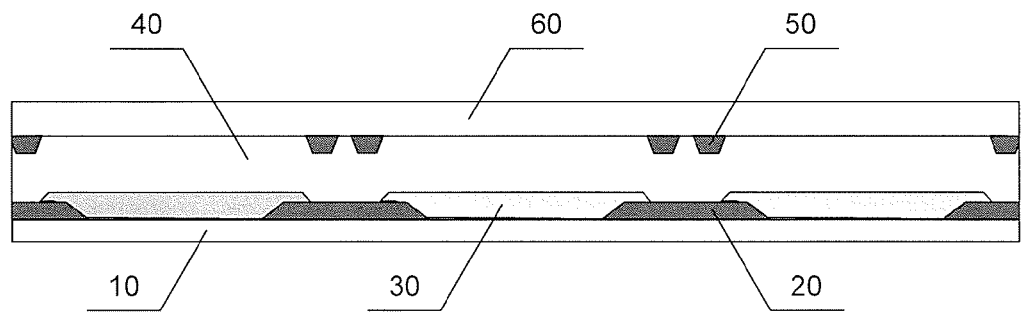
FIG. 10 is a structural view of a color filter substrate according to a second exemplary embodiment of the invention.

FIG. 10 is a structural view of a color filter substrate according to a second exemplary embodiment of the invention, which is a modification of the first embodiment. As shown in FIG. 10, the color filter substrate comprises a substrate 10, first black matrixes 20, color resin units 30, a protection layer 40, second black matrixes 50 and a common electrode layer 60. The first black matrixes 20, the color resin units 30, the protection layer 40 and the common electrode layer 60 are the same as those in the first embodiment. The present embodiment differs from the first embodiment in that two second black matrixes 50 are disposed at each area corresponding to each first black matrix 20. The two second black matrixes 50 correspond to positions on two sides of a corresponding TFT channel region on the array substrate. The manufacturing process for the color filer substrate is substantially the same as that for the first embodiment, except that the number of grooves formed on the protection layer 40 is the same as that of the second black matrixes. Details are omitted for simplicity.

According to optical path analysis, only the reflected light from the two side areas of each first black matrix is possibly incident into a corresponding TFT channel region. The reflected light from other areas of the first black matrix cannot be incident into TFT channel regions. Thus, the present embodiment can effectively prevent the reflected light from entering a TFT channel region by disposing two second black matrixes at the location corresponding to the first black matrix.

Figure 11:
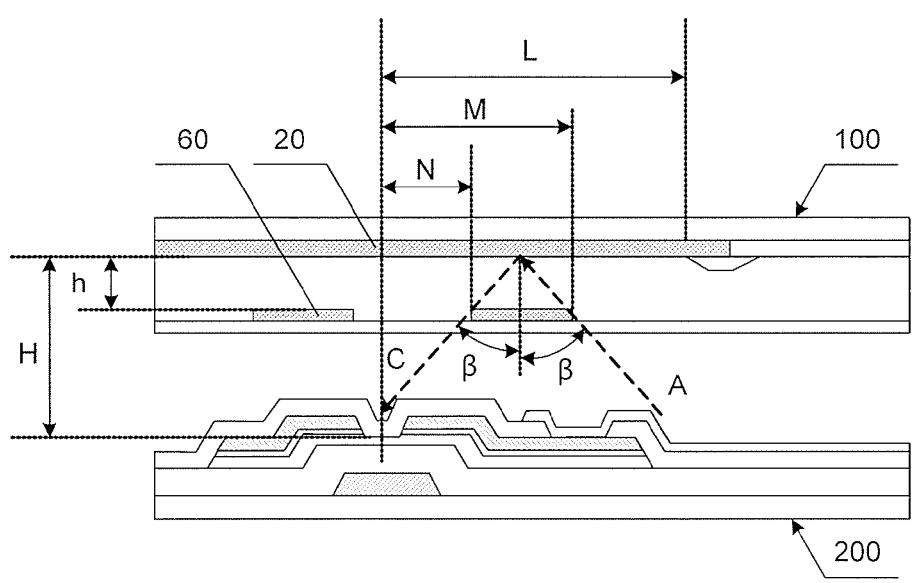
FIG. 11 is a view showing the working principle of a color filter substrate according to a second exemplary embodiment of the invention.

FIG. 11 is a view showing the working principle of the color filter substrate according to the second exemplary embodiment of the invention. Assuming that the color filter substrate 100 and the array substrate 200 assembled together have the same relevant structural parameters as the first embodiment, a distance between the center of the TFT channel region on the array substrate 200 and a corresponding inner edge of one second black matrix 50 on the color filter substrate 100 is N, and a distance between the center of the TFT channel region on the array substrate 200 and a corresponding outer edge of the second black matrix pattern 50 on the color filter substrate 100 is M. N and M should satisfy that the reflected light from the side edge of the first black matrix is totally prevented from entering the TFT channel region. According to the light reflection principle, for the light A from a backlight and light C reflected from the surface of the first black matrix 20, the critical condition is that an incident light passing by an outer edge of the second black matrix 50 is reflected to pass by an inner edge of the second black matrix 50. The distance between the center of the TFT channel region and a corresponding inner edge of the second black matrix pattern 50 should satisfy that the reflected light is totally blocked by the second black matrix. Assuming an incident angle of the incident light a passing by an outer edge of the second black matrix pattern 50 is β and a reflective angle of the reflected light C is also β, the following equations are obtained.

$$tg\beta = \frac{(M-N)/2}{h} \quad (4)$$

$$tg\beta = \frac{(M+N)/2}{H} \quad (5)$$

Equation (6) is obtained from equations (4) and (5).

$$N = \frac{H-h}{H+h}M = L\left(1 - \frac{h}{H}\right)\left(\frac{H-h}{H+h}\right) \quad (6)$$

Thus, the largest distance N at which the inner edge of the second black matrix 50 can totally prevent the reflected light from the first black matrix 20 from entering the TFT channel region on the array substrate can be obtained from equation (6). That is, a distance between the center of the TFT channel region and a corresponding inner edge of the second black matrix 50 should be smaller than a value of N obtained by equation (6). Similarly, parameters for another inner edge of the second black matrix 50 on another side of the TFT channel region can be obtained.

Figure 12:
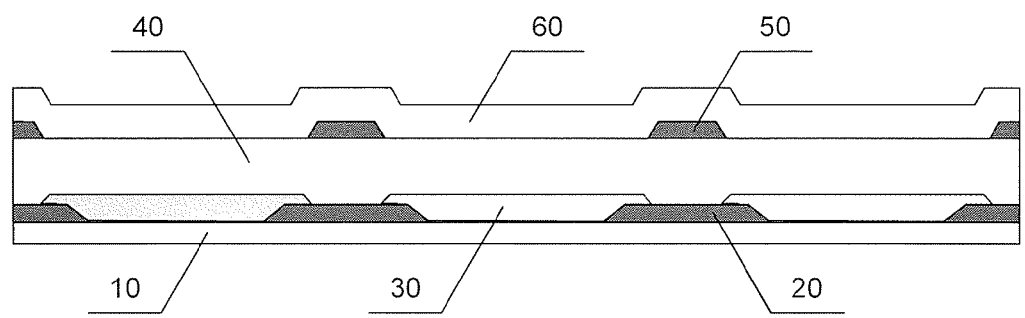
FIG. 12 is a structural view of a color filter substrate according to a third exemplary embodiment of the invention.

FIG. 12 is a structural view of a color filter substrate according to a third exemplary embodiment of the invention. As shown in FIG. 12, the second black matrixes 50 are formed on the flat surface of the protection layer 40, which is different from the first embodiment. The common electrode layer 60 is formed on the protection layer 40 and the second black matrix 50 and covers the whole substrate 10.

In the manufacturing process of the color filter substrate according to the present embodiment, the forming process of the first black matrixes, color resin units and the protection layer is the same as those in the first embodiment as shown in FIGS. 2-4. After forming the protection layer 40, a layer of black matrix material is deposited on the protection layer 40, and then second black matrixes 50 located on the surface of the protection layer 40 are formed. If a resin material is used for the black matrix material, the process of forming the second black matrix may comprise: first depositing a layer of the resin material by using plasma enhanced chemical vapor deposition (PECVD) method; next, exposing the layer of resin material to energy ray by using a normal mask for forming a first area (totally-exposed area) and a second area (totally-unexposed area) of the resin layer; after developing, the layer of the resin material in the second area is completely removed, and the layer of the resin material in the first area is totally remained; after baking process, the second black matrixes 50 are formed. If a metal material is used for the black matrix material, the process of forming the second black matrixes may comprise: first depositing a layer of metal material by using a magnetron sputtering or evaporating method; next, coating a layer of photoresist on the metal material layer; exposing the photoresist layer to energy ray by using a normal mask for forming a first area (totally-exposed area) and a second area (totally-unexposed area) of the photoresist layer; after developing, the layer of photoresist in the second area is completely removed, and the layer of the photoresist in the first area is totally remained; the metal layer in the second area is etched away by etching process; after removing the remained photoresist, the second black matrixes 50 are formed. Finally, a transparent conductive film is deposited by magnetron sputtering or evaporating method to form a common electrode layer 60 on the substrate.

Although the common electrode layer 60 of the present embodiment does not have a flat surface, which slightly affect the subsequent rubbing process of the orientation film that is to be formed on the common electrode layer 60, the protruding portions of the common electrode layer 60 according to the present embodiment are located in areas corresponding to the first black matrixes, that is, in non-display areas, the negative effect on the display quality is negligible. Thus, the color filter substrate according to the present embodiment makes the manufacturing process simple by omitting a planarization process, and effectively prevents light from being incident onto TFT channel regions.

Based on the third embodiment in view of the second embodiment, a solution where two second matrixes are located on the surface of the protection layer can be obtained. The detail is omitted for simplicity.

A manufacturing method of a color filter substrate according to an exemplary embodiment of the invention may comprise the following steps.

Step 1 of forming a first black matrix and a color resin unit on a substrate.

Step 2 of forming a protection layer and a second black matrix on the substrate obtained after step 1, wherein the second black matrix is located in an area corresponding to the first black matrix.

Step 3 of forming a common electrode layer on the substrate obtained after step 2.

The present embodiment provides a method for manufacturing a color filter substrate, in which two layers of black matrix are disposed on the substrate. The second black matrix can effectively block the light that comes from the array substrate side and is reflected by the surface of the first black matrix, so that the reflected light from the surface of the first black matrix will not enter into the TFT channel region.

A manufacturing method of a color filter substrate according to another exemplary embodiment of the invention may comprise the following steps.

Step 11 of forming a first black matrix and a color resin unit on a substrate.

Step 12 of forming a protection layer on the substrate obtained after step 11.

Step 13 of exposing the protection layer to light using a mask and forming a groove in the surface of the protection layer.

Step 14 of depositing a black matrix material layer on the substrate obtained after step 13 such that the black matrix material layer is fully filled in the groove.

Step 15 of removing excessive black matrix material layer on the protection layer using a planarization process such that a second black matrix is formed in the groove, wherein the second black matrix is located at an area corresponding to the first black matrix.

Step 16 of forming a pattern comprising a common electrode layer on the substrate obtained after step 15.

The present embodiment provides a solution, in which grooves are formed in the surface of the protection layer, and a second black matrix is formed within the grooves. The manufacturing process has been described with reference to FIGS. 2-7, the details are omitted here. Further, the second black matrix according to the present embodiment may be one or two. In the present embodiment, metal or resin that has good capability for blocking light can be used for the layer of black matrix material. If resin is used for the first black matrix, the process of forming the first black matrix comprises: first depositing a layer of resin material using plasma enhanced chemical vapor deposition (PECVD) method; next, exposing the layer of resin material to light by using a normal mask for forming a first area (totally-remained area) and a second area (totally-removed area) of the resin layer; after developing, the layer of resin material in the second area is completely removed, and the layer of the resin material in the first area is totally remained; after baking process, the first black matrix is formed. If metal is used for the first black matrix, the process of forming the first black matrix comprises: first depositing a layer of metal material using a magnetron sputtering or evaporating method; next, coating a layer of photoresist on the metal material layer; exposing the photoresist layer to light by using a normal mask for forming a first area (totally-remained area) and a second area (totally-removed area) of the photoresist layer; after developing, the layer of photoresist in the second area is completely removed, and the layer of the photoresist in the first area is remained; the metal layer in the second area is etched away by etching process; after removing the remained photoresist, the first black matrix is formed. Similarly, the second black matrix can also be formed using metal or resin that has good capability for blocking light. If resin is used for the second black matrix, the resin can be deposited using PECVD method, and the planarization process may be an ashing process or a patterning process. Alternately, if metal is used for the second black matrix, the metal can be deposited using a magnetron sputtering or evaporating method, and the planarization process may be performed using CMP.

FIG. 15 is a flowchart showing a manufacturing method of a color filter substrate according to yet another exemplary embodiment of the invention, which comprises:

step 21, forming a pattern comprising a first black matrix and a color resin unit on a substrate;

step 22, coating a protection layer on the substrate obtained through step 21;

step 23, depositing a black matrix material layer on the substrate obtained through step 22, step 24, forming a second black matrix on the surface of the protection layer, wherein the second black matrix locates at an area corresponding to the first black matrix;

Step 25, forming a pattern comprising a common electrode layer on the substrate obtained through step 24.

The present embodiment forms a second black matrix on the surface of the protection layer. The manufacturing process has been described with reference to FIG. 12, the details are omitted here. Further, the second black matrix according to the present embodiment may be one or two. Metal or resin that has good capability for blocking light can be used for the layer of first and second black matrix.

In another embodiment, the common electrode layer is formed on the first black matrixes and the color resin units, then the protection layer is formed on the common electrode layer, and finally the second black matrixes are formed on the protection layer.

In further another embodiment, the color filter substrate does not comprise a common electrode, thus such step of forming a common electrode can be omitted in the above embodiments.

The invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A color filter substrate, comprising:
   first black matrixes;
   color resin units; and
   a protection layer, wherein each of the color resin units is formed between two adjacent first black matrixes, the protection layer is formed on the first black matrixes and the color resin units, second black matrixes are formed, each corresponding to one first black matrix, on the protection layer for blocking reflected light from the first black matrixes from entering TFT channel regions on an array substrate to be provided to oppose the color filter substrate.

2. The color filter substrate according to claim 1, wherein grooves are formed in a surface of the protection layer, and the second black matrixes are formed within the grooves.

3. The color filter substrate according to claim 1, wherein the second black matrixes are formed on the surface of the protection layer.

4. The color filter substrate according to claim 1, wherein one second black matrix is formed in an area corresponding to one first black matrix, and
   wherein on a side of the TFT channel region corresponding to the first black matrix, a distance between the center of the TFT channel region and an outer edge of the second black matrix is larger than M, which satisfies $$M = L\left(1 - \frac{h}{H}\right)$$

where L is a distance between the center of the TFT channel region and a side edge of the first black matrix; H is a distance between a bottom surface of the TFT channel region and a surface of the first black matrix; and h is a distance between opposed surfaces of the first and second black matrixes.

5. The color filter substrate according to claim 1, wherein two second black matrix are formed in an area corresponding to one first black matrix, and
   wherein on a side of the TFT channel region corresponding to the first black matrix, a distance between the center of the TFT channel region and an outer edge of the second black matrix is larger than M, which satisfies $$M = L\left(1 - \frac{h}{H}\right),$$

and a distance between the center of the TFT channel region and an inner edge of the second black matrix is less than N, which satisfies $$N = L\left(1 - \frac{h}{H}\right)\left(\frac{H - h}{H + h}\right)$$

where L is a distance between the center of the TFT channel region and a side edge of the first black matrix; H is a distance between a bottom surface of the TFT channel region and a surface of the first black matrix; and h is a distance between opposed surfaces of the first and second black matrix.

6. The color filter substrate according to claim 1, further comprising a common electrode layer, which is formed on the second black matrixes and the protection layer.

7. The color filter substrate according to claim 1, further comprising a common electrode layer, wherein the common electrode layer is formed on the first black matrixes and the color resin units and the protection layer is formed on the common electrode layer.

8. The color filter substrate according to claim 1, wherein the first black matrixes and the second black matrixes are formed by same materials.

9. A liquid crystal display comprising:
   an array substrate, on which a plurality of thin film transistors (TFTs) are provided;
   a color filter substrate provided opposite to the array substrate and comprising first black matrixes, color resin units and a protection layer, wherein each of the color resin units is formed between two adjacent first black matrixes, the protection layer is formed on the first black matrixes and the color resin units, second black matrixes are formed, each corresponding to one first black matrix, on the protection layer for blocking reflected light from the first black matrixes from entering TFT channel regions on the array substrate; and
   a liquid crystal layer interposed between the array substrate and the color filter substrate.

10. The liquid crystal display according to claim 9, wherein grooves are formed in a surface of the protection layer, and the second black matrixes are formed within the grooves.

11. The liquid crystal display according to claim 9, wherein the second black matrixes are formed on the surface of the protection layer.

12. The liquid crystal display according to claim 9, wherein one second black matrix is formed in an area corresponding to one first black matrix, and
   wherein on a side of the TFT channel region corresponding to the first black matrix, a distance between the center of the TFT channel region and an outer edge of the second black matrix is larger than M, which satisfies $$M = L\left(1 - \frac{h}{H}\right)$$

where L is a distance between the center of the TFT channel region and a side edge of the first black matrix; H is a distance between a bottom surface of the TFT channel region and a surface of the first black matrix; and h is a distance between opposed surfaces of the first and second black matrixes.

13. The liquid crystal display according to claim 9, wherein two second black matrix are formed in an area corresponding to one first black matrix, and
wherein on a side of the TFT channel region corresponding to the first black matrix, a distance between the center of the TFT channel region and an outer edge of the second black matrix is larger than M, which satisfies $$M = L\left(1 - \frac{h}{H}\right),$$

and a distance between the center of the TFT channel region and an inner edge of the second black matrix is less than N, which satisfies $$N = L\left(1 - \frac{h}{H}\right)\left(\frac{H-h}{H+h}\right)$$

where L is a distance between the center of the TFT channel region and a side edge of the first black matrix; H is a distance between a bottom surface of the TFT channel region and a surface of the first black matrix; and h is a distance between opposed surfaces of the first and second black matrix.

14. The liquid crystal display according to claim 9, wherein the color filter substrate further comprises a common electrode layer, which is formed on the second black matrixes and the protection layer.

15. The liquid crystal display according to claim 9, wherein the color filter substrate further comprises a common electrode layer, wherein the common electrode layer is formed on the first black matrixes and the color resin units and the protection layer is formed on the common electrode layer.

16. A method for manufacturing a color filter substrate, comprising:
   step 1 of forming first black matrixes and color resin units on a substrate; and
   step 2 of forming a protection layer and second black matrixes on the substrate obtained after step 1, wherein each of the second black matrixes is formed on the protection layer in an area corresponding to one first black matrix.

17. The method according to claim 16, wherein forming the protection layer and second black matrixes in the step 2 comprises:
   forming the protection layer on the substrate obtained after step 1;
   exposing the protection layer by using a mask and forming grooves in a surface of the protection layer;
   forming a black matrix material layer such that the black matrix material layer is fully filled in the grooves; and
   removing the excessive black matrix material layer on the surface of the protection layer by using a planarization process such that the second black matrixes are formed in the grooves.

18. The method according to claim 17, wherein the planarization process is a patterning process or a chemical mechanic polishing process.

19. The method according to claim 16, wherein forming the protection layer and second black matrixes in the step 2 comprises:
   forming the protection layer on the substrate obtained after step 1;
   forming a black matrix material layer on the protection layer; and
   forming the second black matrixes on a surface of the protection layer.

20. The method according to claim 16, further comprising:
   Step 3 of forming a common electrode layer on the substrate obtained after step 2.

21. The method according to claim 16, wherein, in step 1, a common electrode layer is further formed on the first black matrixes and the color resin units.

* * * * *